United States Patent [19]

Kneifel et al.

[11] Patent Number: 4,818,452
[45] Date of Patent: Apr. 4, 1989

[54] METHOD OF MANUFACTURING AN INTEGRAL ASYMMETRICAL MEMBRANE

[75] Inventors: Klemens Kneifel, Geesthacht; Klaus-Viktor Peinemann, Reinbek; Rudolf Waldemann, Lauenburg, all of Fed. Rep. of Germany

[73] Assignee: GKSS Forschungszentrum Geesthacht GmbH, Geesthacht, Fed. Rep. of Germany

[21] Appl. No.: 191,226

[22] Filed: May 6, 1988

[30] Foreign Application Priority Data

May 20, 1987 [DE] Fed. Rep. of Germany .. 37169165

[51] Int. Cl.$^4$ .............................................. B01D 13/01
[52] U.S. Cl. ....................................... 264/41; 55/158; 210/500.39; 264/DIG. 48; 264/DIG. 62
[58] Field of Search ........................ 264/41, 45.2, 46.4, 264/46.6, 46.8, 46.9, DIG. 48, DIG. 62; 55/158; 210/500.39

[56] References Cited

U.S. PATENT DOCUMENTS 4,357,401 11/1982 Andre et al. ........................ 429/192
4,673,418 6/1987 Peinemann ............................ 55/158

Primary Examiner—Frank Sever
Attorney, Agent, or Firm—Becker & Becker, Inc.

[57] ABSTRACT

A method of manufacturing an integral asymmetrical membrane for the separation of liquid or gaseous mixtures. A membrane-forming agent in the form of a polyetherimide is mixed with a solvent that is miscible with water. The resulting mixture is introduced into or accommodated in a geometrical form. The form is then brought into contact with a precipitating agent and is post-treated.

14 Claims, 2 Drawing Sheets

METHOD OF MANUFACTURING AN INTEGRAL ASYMMETRICAL MEMBRANE

BACKGROUND OF THE INVENTION

The present invention relates to a method of manufacturing an integral asymmetrical membrane for the separation of liquid or gaseous mixtures, and includes the steps of mixing a membrane-forming agent with a solvent, introducing or accommodating the membrane-forming agent/solvent mixture in a geometrical form, and then bringing the form into contact with a precipitating agent and providing posttreatment.

A manufacturing process of this type is disclosed in German Pat. No. 34 20 373. The membranes manufactured pursuant to this process can be used only for the separation of gases. Furthermore, these membranes have a thick, nonporous skin, so that due to the thereby resulting low rates of permeation, these membranes are not suitable for, for example, the production of composite membranes. On the other hand, the manufacture of hollow-filament membranes can be carried out only with great difficulty and is very inconvenient, since the viscosities of polymer solutions that can be achieved are not adequate, and must be precipitated in organic media (for example to protect against explosion).

The manufacture of hollow-filament, composite, or flat membranes using various polymers, such as cellulose acetate, polysulfone, and polyamide resins can be carried out with more or less success (Egli, S. et al, "Gastrennung mittels Membranen", reprint from SWISS CHEM. 6 (1984) No. 9, 89–126). However, the use of these polymers is poorly suited for the manufacture of composite membranes due to the fact that these polymers have an unsatisfactory chemical stability, and often produce membranes with too low of a permeability. Furthermore, with this known method it is basically difficult to produce hollow-filament membranes having nearly the same permeability as comparable flat membranes, since hollow-filament membranes are self supporting and therefore generally must be thicker and must have a denser morphological structure. In addition, the resistance of these hollow-filament membranes to pressure is not very great. In some cases, the high viscous solution required for the manufacture of hollow-filament membranes can be achieved only by the addition of a further polymer to form a spinning solution. Difficulties are involved with this addition, since normally different polymers cannot be mixed together in a solution (for example polysulfone with polyvinylpyrrolidone, or PVP); in addition, the added polymer must again be removed after the precipitation.

It is therefore an object of the present invention to improve, for example, the method in such a way that it can be used to manufacture membranes having any desired geometrical shape, an adjustable morphologic structure, a thick or microporous skin that is formed on the outside and/or on the inside, high permeability, and, for hollow filaments, a good mechanical strength.

BRIEF DESCRIPTION OF THE DRAWINGS

This object, and other objects and advantages of the present invention, will appear more clearly from the following specification in conjunction with the accompanying tables and drawings.

SUMMARY OF THE INVENTION

Figure 1:
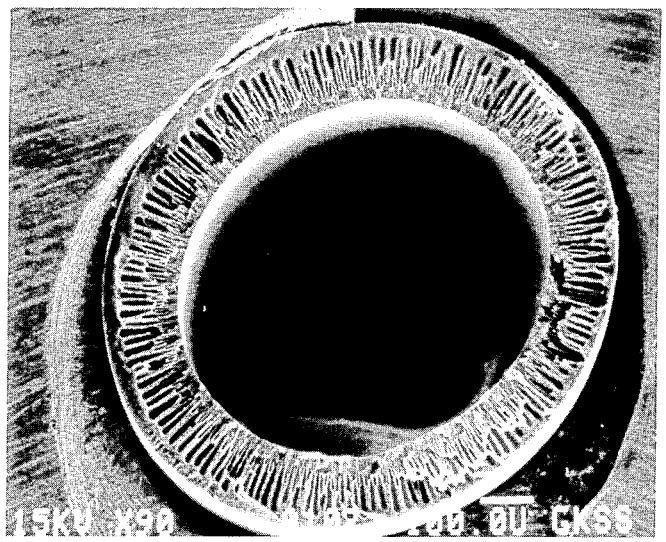
FIGS. 1–4 are enlarged photographic views through portions of exemplary embodiments of membranes manufactured pursuant to the inventive method.

The method of the present invention is characterized primarily in that the membrane-forming agent is a polyetherimide that is combined, prior to the precipitation, with a solvent that is miscible in water.

The following are particular advantages of the inventive method:

a. the precipitation is effected in water or in aqueous solutions;
b. the membranes have a microporous skin and correspondingly high rates of permeation for the manufacture of composite membranes (in so doing the transport properties are determined by the respective coating material), and are selectively manufactured with
   1. a cavity-containing substructure (finger structure) as is required for use with low trans-membrane pressures and high rates of permeation, for example for vaporous or liquid media, or
   2. a cavity-free spongy or porous structure, as is required for use with high pressures, for example in gas-separation applications;
c. the membranes are provided with a thick, largely nonporous skin, with the transport properties essentially being determined by the matrix polymer; and
d. the membranes have a high mechanical strength.

Not only flat membranes but also hollow-filament or HF membranes can be manufactured from polyetherimide. Consequently, the modulus fabrication is simplified, and a greater amount of membrane surface can be provided per unit of modulus volume. The manufacture of the membrane is straightforward, and the membrane that is obtained can be used to produce composite membranes, thereby considerably expanding the range of application.

DESCRIPTION OF PREFERRED EMBODIMENTS

The present invention will now be described in detail with the aid of several specific embodiments utilizing FIGS. 1–4 and Tables 1–8.

In particular, the manufacture of integral asymmetrical hollow-filament membranes will be set forth; these membranes are manufactured pursuant to the principle of the dry-wet-spinning process. In this connection the polymer solution is pressed through a ring nozzle or tubular die that contains a hollow needle in the middle. Simultaneously fed through the hollow needle is an inner fluid that serves either only to fill the filament volume and prevent collapse prior to the conclusion of the precipitation process, or that acts as a precipitating agent and thus effects a precipitation of the hollow filament from the inside.

After leaving the spinning nozzle, the hollow filament is spun through an air gap into the precipitation bath (dry-wet-spinning process).

The properties of the hollow filaments are determined by:

1. the composition of the polymer solution (the important thing is as high a viscosity as possible, with this viscosity being approximately 10,000–100,000 cp);
2. the spinning conditions; and
3. the posttreatment of the hollow filaments.

The polymer solutions comprise 10–35% by weight polyetherimide (Ultem, from General Electric), especially solutions having 20–28% by weight polyetherimide (PEI), plus alternatively 1. a solvent that is miscible with water, such as N-methylpyrrolidone (NMP), dimethylformamide (DMF), dimethyl acetamide (DMAC), N-formyl-piperidine (NFP); or
2. a solvent as in 1. above, and in addition water soluble swelling agent such as a lactone (for example the γ-butyrolactone (GBL), or dimethyl sulfoxide (DMSO).

Via the swelling agent (GBL), on the one hand the speed of the solvent exchange can be reduced during the precipitation process and as a result the morphological properties of the hollow filaments (number and size of the macro pores) can be influenced, and on the other hand the viscosity that is as high as possible for the spinning process is achieved without having to increase the polymer concentration or having to add an additional polymer. An increase of the polymer concentration would lead to a very thick membrane, whereas in contrast by adding GBL, a more open membrane is achieved while at the same time increasing the viscosity.

Various PEI solutions are listed in Table 1; all of these solutions have approximately the same viscosity (n=30,000 cp).

An inner fluid, and for the outer precipitation bath, it is possible to use pure water, water that contains solvent, or aqueous solutions of organic compounds (such as polyhydric alcohols, glycerol, and ethylene glycol). As a result of the additives to the water, the precipitation rate is affected, thereby altering the morphological properties of the hollow filament. If the inner fluid is not intended to carry out a precipitation function, but rather only a filling solution, an inert liquid, such as silicone oil, is used.

As a result of a suitable selection of the inner fluid and the precipitation bath medium, hollow filaments can be spun that either on the inside, on the outside, or on both sides include a very thin skin that determines the separation properties.

Variable spinning conditions include the dimensions of the spinning nozzle, the flow of polymer solution and inner fluid (the spinning speed or rate), the distance between the nozzle and the outer precipitation bath, and the spinning temperature.

The dimensions for the spinning nozzles that are used are listed in Table 2.

The flow of the polymer solution through these nozzles was, at a viscosity of approximately 30,000 cp, about 7.0 g/min, while the flow of the inner fluid (water) was about 5.0 g/min.

The distance between the nozzle and the precipitation bath was 0.9–1.0 m. The process was carried out at room temperature.

A posttreatment of the precipitated hollow filaments can be necessary for the removal of residual solvent and to condition the membrane structure. Therefore, after being washed with water at room temperature, some of the hollow filaments were alternatively treated with water at 90° C. or with organic liquids that do not dissolve PEI yet mix with the solvent that was used (isopropanol, methanol, acetone).

To manufacture composite membranes, coatings were tried with silicone (VP7660, Wacker Chemie, Munich) and with polymethylpentenes (TPX MX002, Mitusi, Japan). The coating process is effected by drawing diluted coating solution through the internal diameter or lumen of the hollow filaments, and subsequently drawing air therethrough.

The permeability measurements were carried out with the gases oxygen, nitrogen, and helium at a transmembrane pressure differential of 5 bar. The higher pressure generally existed on the inner side of the HF membrane; in other words, the permeation direction was from the inside toward the outside. When measuring with helium, some of the specimens were also alternatively subjected to pressure from the outside. The ratio of the permeabilities of the gases A and B is designated at selectivity, $\alpha = P_A/P_B$.

With the subsequently enumerated tests, completely demineralized water was used as the inner fluid, and tap water was used as the precipitation bath medium. The temperature of the polymer solutions and of the inner fluid was 20±2° C., and the temperature of the precipitation bath was 6°–15° C. The hollow filaments were rinsed with tap water at room temperature (about 4 h) and were then dried at 70° C. in a drying mechanism. Alternatively, the washed but not yet dried hollow filaments were subjected to a posttreatment with organic agents.

The polymer solutions that were used are listed in Table 3, and the posttreatment methods are listed in Table 4.

Table 5 shows two examples for the manufacture of hollow-filament membranes, and also shows the properties thereof.

The influence of the swelling agent GBL upon the morphology of the HF membranes is illustrated in FIGS. 1–4 with the aid of REM Roentgen, raster or X-ray radiation electron microscope photographs of cross sections of the membranes.

Figure 2:
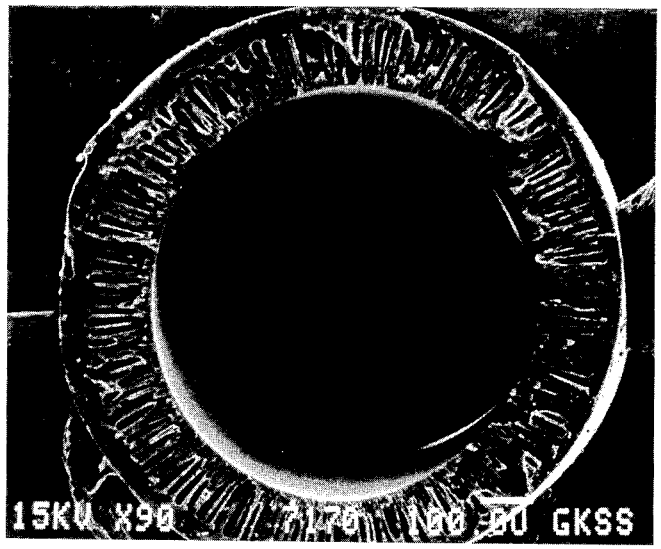
Figure 3:
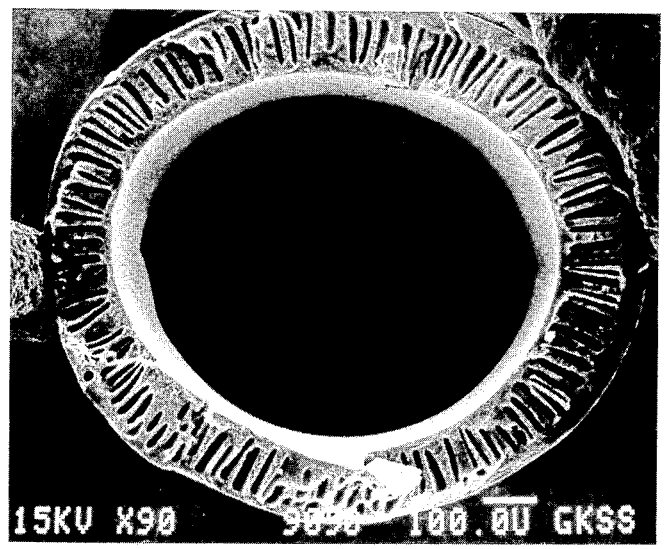
Figure 4:
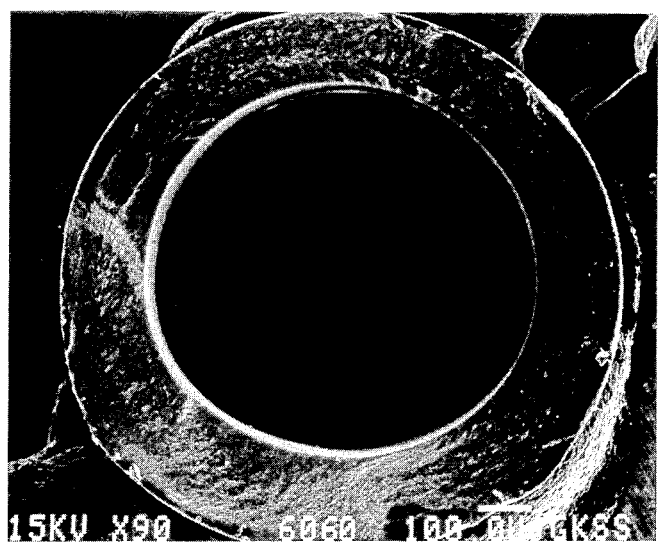

At 25% by weight PEI (Solution I), and no swelling agent, hollow filaments are obtained that have a large number of cavities (macro pores) that extend over nearly the entire thickness of the wall (FIG. 1). By increasing the polymer content to 28% (Solution II), the number of cavities is reduced, and they no longer extend to the outer surface, with a narrow region having a spongy or porous structure remaining (FIG. 2). The addition of 30% GBL (Solution V) reduces the number of cavities (FIG. 3). By increasing the GBL content to 40% (Solution VI), a purely spongy structure without cavities is obtained (FIG. 4).

The outer diameter of the hollow filaments illustrated in FIGS. 1–4 is 1.0–1.1 mm, and the inner diameter is 0.7–0.8 mm.

The effects of the composition of the polymer solution, especially the influence of the GBL content, upon the permeability and selectivity for the gases oxygen, nitrogen, and helium are listed in Tables 6–8.

Table 6 lists the oxygen permeabilities for HF membranes that are not coated.

In contrast hereto, for uncoated, porous HF membranes of polysulfone, U.S. Pat. No. 4,230,463 (Henis, J. M. S. and Tripodis, M. K., Multicomponent membranes for gas separations) lists permeabilities for air of 0.04–2.6 $m^3/m^2.h.bar$, and for HF membranes of cellulose acetate (posttreated with warm water) lists permeabilities of 0.07–0.16 $m^3/m^2.h.bar$. Via special posttreatment (drying by solvent exchange isopropanol/pentene) an air permeability of 4.1 $m^3/m^2.h.bar$ was achieved for the polysulfone HF membrane.

After a posttreatment with warm water, or after a simple solvent exchange with isopropanol or acetone (without further exchange of the isopropanol or acetone with a hydrocarbon), the HF membranes manufactured pursuant to the present invention had permeation rates that were approximately 3 times as great. These permeabilities were measured with oxygen. Since the selectivity for $O_2/N_2$ of porous membranes is approximately 1.0, these permeabilities can be compared to the air permeabilities measured using the methods described in the aforementioned U.S. Patent of Henis and Tripodis.

By increasing the temperature of the inner fluid, reducing the PEI content to approximately 20%, while simultaneously increasing the GBL content to greater than 60%, still greater permeabilities can be achieved, even without a post treatment.

Table 7 lists the oxygen permeabilities and the selectivity for $O_2/N_2$ of composite membranes of PEI having a silicone coating.

For oxygen/nitrogen, the intrinsic selectivity of polydimethylsiloxane is 2.15, and of polysulfone is 6.1. The intrinsic selectivity of PEI is not known; however, with asymmetrical flat membranes values were measured for $O_2/N_2=9$ and for $He/N_2=260$.

From the first column of Table 7, it can be seen that the polydimethylsiloxane (PDMS)-coated HF membranes of the solutions I, II, and III, without posttreatment, had selectivities (5.7–7.0) that were much higher than would correspond to a silicone coating. In other words, these membranes have a thick, nearly porous-free skin of PEI. The permeabilities are correspondingly low (0.003–0.006 $m^3/m^2.h.bar$). These membranes have a structure that is similar to that described in the Henis and Tripodis patent, where selectivities of 3.4–5.0 and permeabilities for oxygen of 0.02–0.06 $m^3/m^2.h.bar$ are given.

The HF membranes manufactured from the solutions IV, V, and VI show a selectivity that approximates that of the coating material PDMS (2.4–3.0). Via posttreatment, membranes with the selectivity of silicone (approximately 2.0) and at the same time with very high permeabilities for oxygen up to 0.9 $m^3/m^2.h.bar$ are obtained. With the HF membranes from solution VI, via an additional coating with polymethylpentene, the selectivity for $O_2/N_2$ could be increased to 1.8 at a still relatively high permeability of 0.5 $m^3/m^2.h.bar$.

The test results shown in Table 8 for silicone-coated HF membranes of PEI show that the selectivities that were achieved for $He/N_2$ are in the range of the flat PEI membranes manufactured pursuant to German Pat. No. 34 20 373. However, the He permeabilities are two to three times lower than for flat membranes. This drawback is more than compensated for in practice by the more favorable ratio of membrane surface to modulus volume (packing density) that is obtained with HF membranes.

With individual samples made from solution I, selectivities of about 200 at permeabilities of approximately 0.07 $m^3/m^2.h.bar$ were measured, even without coatings.

TABLE 1

Polyetherimide solutions having approximately the same viscosity

| Solvent | GBL content % | PEI content % | Viscosity $n_{20°C}$ |
|---|---|---|---|
| NMP | 40 | 25 | 31,000 |
| NMP | — | 28 | 31,000 |
| DMF | — | 30.4 | 29,000 |
| DMA | — | 30.4 | 29,000 |

TABLE 2

Dimensions for the spinning nozzle

| | |
|---|---|
| Diameter of the ring nozzle | 1.3 mm |
| Outer diameter of the hollow needle | 0.90 mm |
| Inner diameter of the hollow needle | 0.46 mm |

TABLE 3

Polymer solutions

| Solution | PEI % | NMP % | GBL % | $h_{20°C}$ cp |
|---|---|---|---|---|
| I | 25 | 75 | — | 11,000 |
| II | 28 | 72 | — | 31,000 |
| III | 25 | 70 | 5 | 13,000 |
| IV | 25 | 55 | 20 | 19,000 |
| V | 25 | 45 | 30 | 22,000 |
| VI | 25 | 35 | 40 | 31,000 |

TABLE 4

Posttreatment methods

| | Medium | Temperature °C. | Time h | Drying Temperature °C. |
|---|---|---|---|---|
| A | Water | 90 | 2 | 70 |
| B | Isopropanol | ~20 | ~12 | ~20 |
| C | Acetone | ~20 | ~12 | ~20 |

TABLE 5

Examples for the manufacture of HF membranes

| | Example 1 | Example 2 |
|---|---|---|
| Spinning nozzle | see TABLE 2 | |
| Spinning conditions | | |
| Inner fluid | completely demineralized water | |
| Inner fluid temperature in °C. | 22 | 22 |
| Inner fluid flow in g/min | 7.0 | 7.0 |
| Polymer solution | V | VI |
| Polymer solution temperature in °C. | 22 | 22 |
| Polymer solution flow in g/min | 5.3 | 4.6 |
| Precipitation bath | tap water | |
| precipitation bath temperature in °C. | 6 | 15 |
| Distance of nozzle to precipitation bath in m | 0.95 | 0.92 |
| Property of the hollow filament | | |
| Outer diameter in mm | 1.1 | 1.1 |
| Inner diameter in mm | 0.8 | 0.8 |
| Uncoated hollow filament | | |
| P—$O_2$ without posttreatment in $m^3/m^2 \cdot h \cdot bar$ | 2.4 | — |
| $\alpha O_2/N_2$ | 0.95 | |
| P—$O_2$ with posttreatment in $m^3/m^2 \cdot h \cdot bar$ | 12 | — |
| $\alpha O_2/N_2$ | 0.94 | |
| coated hollow filament (VP7660) | | |
| P—$O_2$ with posttreatment in $m^3/m^2 \cdot h \cdot bar$ | 0.7 | — |
| $\alpha O_2/N_2$ | 2.3 | — |
| P—$O_2$ with posttreatment A in $m^3/m^2 \cdot h \cdot bar$ | — | 0.8 |
| $\alpha O_2/N_2$ | — | 2.0 |

P—$O_2$ = permeability for oxygen
$\alpha O_2/N_2$ = selectivity for oxygen/nitrogen

TABLE 6

Oxygen permeabilities for uncoated HF membranes. The permeabilities are given in $m^3/m^2 \cdot h \cdot bar$.

| Solution | P—$O_2$ | | | |
|---|---|---|---|---|
| | — | A | B | C |
| | | Posttreatment | | |
| I | 0.03 | — | — | — |
| II | 0.03 | 0.2 | 0.2 | — |
| III | 0.02 | — | 10 | 29 |
| IV | — | 11 | 11 | 12 |
| V | 2.4 | — | 12 | 9 |

TABLE 7

Oxygen permeability and selectivity for $O_2/N_2$, HF membranes of PEI with a coating of silicon VP7660. P—$O_3$ = permeability for oxygen in $m^3/m^2 \cdot h \cdot bar$

| Solution Number | Posttreatment | | | | | | | |
|---|---|---|---|---|---|---|---|---|
| | — | | A | | B | | C | |
| | P—$O_2$ | $\alpha \frac{O_2}{N_2}$ | P—$O_2$ | $\alpha \frac{O_2}{N_2}$ | P—$O_2$ | $\alpha \frac{O_2}{N_2}$ | P—$O_2$ | $\alpha \frac{O_2}{N_2}$ |
| I | 0.003 | 7.0 | — | — | — | — | — | — |
| II | 0.003 | 6.7 | 0.2 | 1.3 | 0.1 | 1.7 | — | — |
| III | 0.006 | 5.7 | — | — | — | — | 0.4 | 2.5 |
| IV | 0.02 | 2.7 | 0.9 | 2.1 | 0.4 | 2.3 | 0.4 | 2.3 |
| V | 0.03 | 2.4 | — | — | 0.7 | 2.3 | 0.5 | 2.3 |
| VI | 0.04 | 3.0 | 0.8 | 2.0 | 0.6 | 1.7 | — | — |

TABLE 8

Helium permeability and selectivity for He/$N_2$, HF membranes with a silicone coating and no posttreatment.
P—He = permeability for helium in $m^3/m^2 \cdot h \cdot bar$
$p_i$ = pressure on the inner side of the HF membrane
$p_a$ = pressure on the outer side of the HF membrane

| Solution No. | $p^i > p_a$ | | $p_i > p_a$ | |
|---|---|---|---|---|
| | P—He | $\frac{He}{N_2}$ | P—He | $\frac{He}{N_2}$ |
| I | 0.07 | 160 | 0.05 | 203 |
| II | 0.06 | 200 | — | — |
| III | 0.15 | 130 | — | — |

The present invention is, of course, in no way restricted to the specific disclosure of the specification, examples, and drawings, but also encompasses any modifications within the scope of the appended claims.

What we claim is:

1. A method comprising manufacturing an integral asymmetrical hollow-filament membrane for the separation of liquid or gaseous mixtures, by,
   providing a membrane-forming agent in the form of a polyetherimide;
   mixing said polyetherimide with a solvent that is miscible with water; then
   accommodating the resulting polyetherimide/solvent mixture in a geometrical form; and then
   bringing said form into contact with a precipitating agent and providing posttreatment.

2. A method according to claim 1, which includes the step of mixing a water-soluble swelling agent with said polyetherimide/solvent polymer solution mixture.

3. A method according to claim 2, in which said polyetherimide/solvent polymer solution mixture comprises 10–35% by weight polyetherimide and a solvent selected from the group consisting of N-methylpyrrolidone (NMP), dimethylformamide (DMF), dimethyl acetamide (DMAC), and N-formylpiperidine (NFP).

4. A method according to claim 3, in which said swelling agent is selected from the group consisting of lactones and dimethyl sulfoxide (DMSO).

5. A method according to claim 4, in which said swelling agent is γ-butyrolactone (GBL).

6. A method according to claim 1, which includes the step of providing a precipitation bath in the form of a material selected from the group consisting of water, water that contains solvent, water that contains swelling agent, water that contains solvent and swelling agent, and aqueous solutions of organic substances.

7. A method according to claim 6, in which said precipitation bath comprises an aqueous solution of organic substances selected from the group consisting of polyhydric alcohols, glycerol, and ethylene glycol.

8. A method according to claim 6, which includes the step of using said precipitation bath as an inner fluid during the manufacture of hollow-filament membranes.

9. A method according to claim 1, which includes the step of using an inert liquid as an inner fluid during the manufacture of said membrane.

10. A method according to claim 9, which includes the step of using silicone oil as said inert liquid.

11. A membrane manufactured pursuant to the method of claim 1 and having a microporous skin that can be coated.

12. A membrane according to claim 11, in which said membrane has a substructure that contains cavities.

13. A membrane according to claim 11, in which said membrane has a spongy structure.

14. A membrane manufactured pursuant to the method of claim 1 and having a thick, nonporous skin.

* * * * *